United States Patent
Huang et al.

(10) Patent No.: US 9,442,834 B2
(45) Date of Patent: Sep. 13, 2016

(54) DATA MANAGEMENT METHOD, MEMORY CONTROLLER AND MEMORY STORAGE DEVICE

(71) Applicant: PHISON ELECTRONICS CORP., Miaoli (TW)

(72) Inventors: Yi-Hsiang Huang, Hsinchu (TW); Chao-Ming Chan, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 509 days.

(21) Appl. No.: 13/633,140

(22) Filed: Oct. 2, 2012

(65) Prior Publication Data

US 2014/0040533 A1    Feb. 6, 2014

(30) Foreign Application Priority Data

Aug. 1, 2012  (TW) .............................. 101127807 A

(51) Int. Cl.
    *G06F 12/02* (2006.01)
(52) U.S. Cl.
    CPC ........... *G06F 12/02* (2013.01); *G06F 12/0246* (2013.01); *G06F 2212/7211* (2013.01)
(58) Field of Classification Search
    CPC ........... G06F 2212/7211; G06F 12/02; G06F 12/0246
    USPC ...................................... 365/185.33; 711/103
    See application file for complete search history.

(56) References Cited

U.S. PATENT DOCUMENTS

| 7,409,492 | B2 * | 8/2008 | Tanaka et al. | 711/103 |
| 2010/0023800 | A1 * | 1/2010 | Harari et al. | 714/2 |
| 2011/0113184 | A1 * | 5/2011 | Chu | 711/103 |
| 2012/0317345 | A1 * | 12/2012 | Pan et al. | 711/103 |

FOREIGN PATENT DOCUMENTS

| TW | 201117001 | 5/2011 |
| TW | 201120896 | 6/2011 |

* cited by examiner

*Primary Examiner* — Reginald Bragdon
*Assistant Examiner* — Mehdi Namazi
(74) *Attorney, Agent, or Firm* — Jianq Chyun IP Office

(57) ABSTRACT

A data management method for a rewritable non-volatile memory module including a first memory unit and a second memory unit is provided. The method includes: grouping erasing units of the first memory unit into a data area and a spare area; and grouping the physical erasing units of the second memory unit into a data backup area and a command recording area; configuring multiple logical addresses to map to the physical erasing units associated with the data area; receiving a write command which instructs writing data; writing the data to a physical erasing unit associated with the spare area, and writing the data to a physical erasing unit associated with the data backup area; recording at least a portion of the write command in a physical erasing unit associated with the command recording area. Accordingly, data is backuped in the rewritable non-volatile memory module.

30 Claims, 12 Drawing Sheets

DATA MANAGEMENT METHOD, MEMORY CONTROLLER AND MEMORY STORAGE DEVICE

CROSS-REFERENCE TO RELATED APPLICATION

This application claims the priority benefit of Taiwan application serial no. 101127807, filed on Aug. 1, 2012. The entirety of the above-mentioned patent application is hereby incorporated by reference herein and made a part of this specification.

BACKGROUND

1. Technology Field

The invention relates to a data management method, a memory controller, and a memory storage device for a rewritable non-volatile memory module.

2. Description of Related Art

There is a rapid growth of digital cameras, mobile phones, and MP3 players in the past few years, which leads to a dramatic increase in consumers' demand for storage media. Since a rewritable non-volatile memory module (for example, a flash memory) is characterized in non-volatile data, power saving, being compact, and being without mechanical structures, the rewritable non-volatile memory module is suitable for being embedded in the aforementioned portable multimedia devices given as examples.

Generally speaking, a rewritable non-volatile memory module includes a plurality of physical blocks. New data may not be written to a physical block before the physical block is erased. Therefore, a memory controller needs to manage the rewritable non-volatile memory module through the operation of integration and moving. When the rewritable non-volatile memory module backs up data, if a method of redundant array of inexpensive disks-1 (RAID-1) is used to back up the data, then the operation of aforementioned integration and moving will be executed twice, resulting in extra burden for the system. Therefore, how the data may be effectively backed up in the rewritable non-volatile memory module is an issue concerned by researchers in the field.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The example embodiments of the invention provide a data management method, a memory controller, and a memory storage device for data to be backed up in a rewritable non-volatile memory module.

An example embodiment of the invention provides a data management method for a rewritable non-volatile memory module. The rewritable non-volatile memory module includes a first memory unit and a second memory unit. The first memory unit includes a plurality of first physical erasing units and the second memory unit includes a plurality of second physical erasing units. The data management method includes: grouping the first physical erasing units into at least a data area and a spare area and grouping the second physical erasing units into at least a data backup area and a command recording area, configuring a plurality of logical addresses to map to the first physical erasing units associated with the data area, receiving a write command which instructs to write a first data to at least one first logical address, writing the first data to one of the first physical erasing units associated with the spare area and writing the first data to one of the second physical erasing units associated with the data backup area, and recording at least a portion of the write command in one of the second physical erasing units associated with the command recording area.

From another perspective, an example embodiment of the invention provides a memory storage device, including a connector, a rewritable non-volatile memory module, and a memory controller. The connector is coupled to a host system. The rewritable non-volatile memory module includes a first memory unit and a second memory unit. The first memory unit includes a plurality of first physical erasing units and the second memory unit includes a plurality of second physical erasing units. The memory controller is coupled to the connector and the rewritable non-volatile memory module for grouping the first physical erasing units into at least a data area and a spare area, grouping the second physical erasing units into at least a data backup area and a command recording area, and configuring a plurality of logical addresses to map to a first physical erasing unit associated with the data area. The memory controller also receives a write command which instructs to write a first data to at least a first logical address. The memory controller also writes the first data to one of the first physical erasing units associated with the spare area, writes the first data to one of the second physical erasing units associated with the data backup area, and records at least a portion of the write command in one of the second physical erasing units associated with the command recording area.

From another perspective, an example embodiment of the invention provides a memory controller, including a host interface, a memory interface, and a memory management circuit. The host interface is coupled to a host system. The memory interface is coupled to a rewritable non-volatile memory module including a first memory unit and a second memory unit. The first memory unit includes a plurality of first physical erasing units and the second memory unit includes a plurality of second physical erasing units. The memory management circuit is coupled to the host interface and the memory interface for grouping the first physical erasing units into at least a data area and a spare area, grouping the second physical erasing units into at least a data backup area and a command recording area, and configuring a plurality of logical addresses to map to a first physical erasing unit associated with the data area. The memory management circuit also receives a write command which instructs to write a first data to at least a first logical address. The memory management circuit also writes the first data to one of the first physical erasing units associated with the spare area, writes the first data to one of the second physical erasing units associated with the data backup area, and records at least a portion of the write command in one of the second physical erasing units associated with the command recording area.

According to the above, the data management method, the memory controller, and the memory storage device provided in the invention may back up the data in the rewritable non-volatile memory.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the invention more comprehensible, embodiments accompanying figures are described in detail below.

DESCRIPTION OF EMBODIMENTS

Figure 1A:
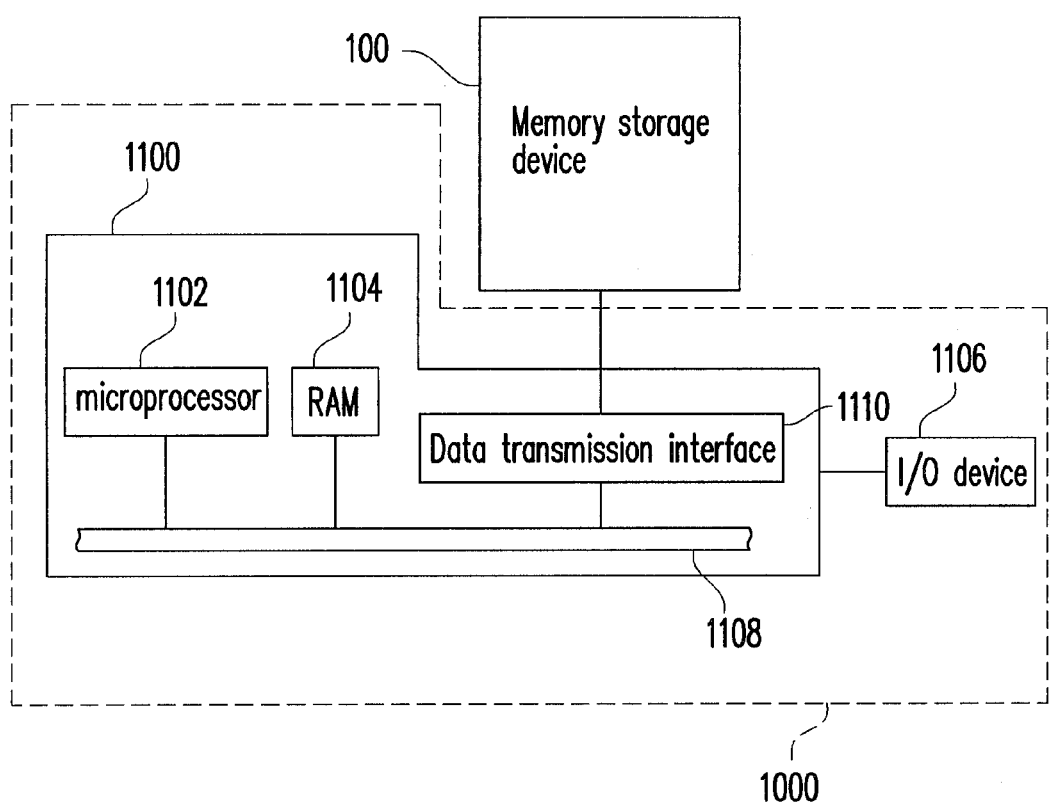
FIG. 1A illustrates a host system and a memory storage device according to an example embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally speaking, a memory storage device (i.e. a memory storage system) includes a rewritable non-volatile memory module and a controller (i.e. a control circuit). Usually the memory storage device is used together with a host system so that the host system may write a data to the memory storage device or read the data in the memory storage device.

FIG. 1A illustrates a host system and a memory storage device according to an example embodiment.

Figure 1B:
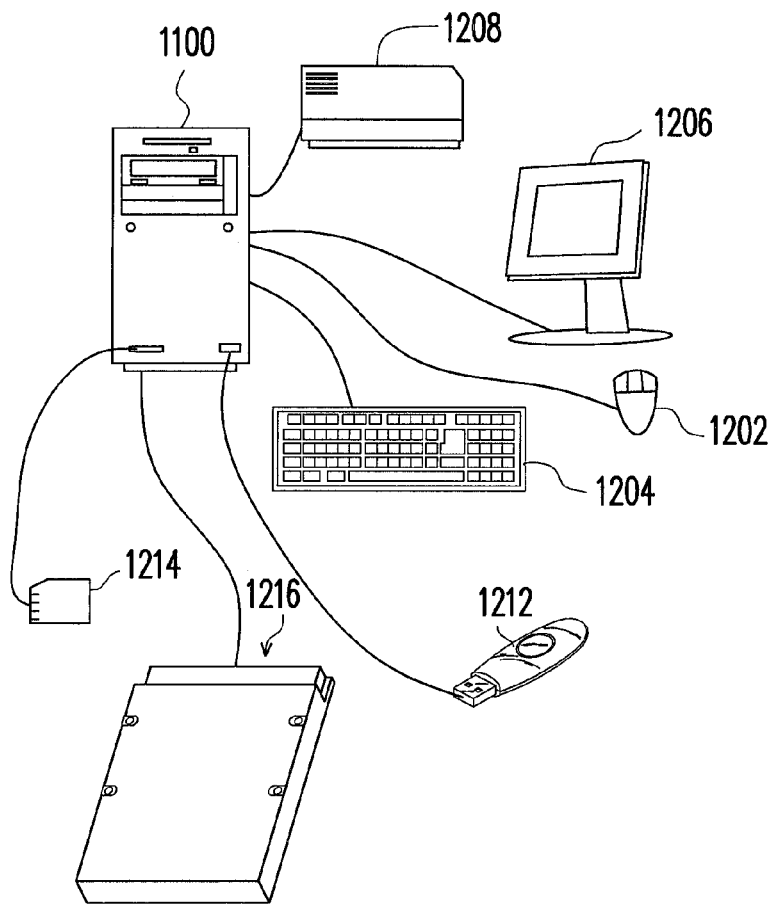
FIG. 1B illustrates a schematic view of a computer, an input/output device, and a memory storage device according to an example embodiment.

Please refer to FIG. 1A, generally a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a monitor 1206, and a printer 1208 as shown in FIG. 1B. It should be understood that the devices shown in FIG. 1B do not limit the I/O device 1106, which may further include other devices.

In the embodiments of the invention, a memory storage device 100 is coupled to other elements of the host system 1000 through the data transmission interface 1110. With the operation of the microprocessor 1102, the RAM 1104, and the I/O device 1106, the data may be written to the memory storage device 100 or be read in the memory storage device 100. For example, the memory storage device 100 may be a rewritable non-volatile memory storage device such as a flash drive 1212, a memory card 1214, or a solid state drive (SSD) 1216 as shown in FIG. 1B.

Figure 1C:
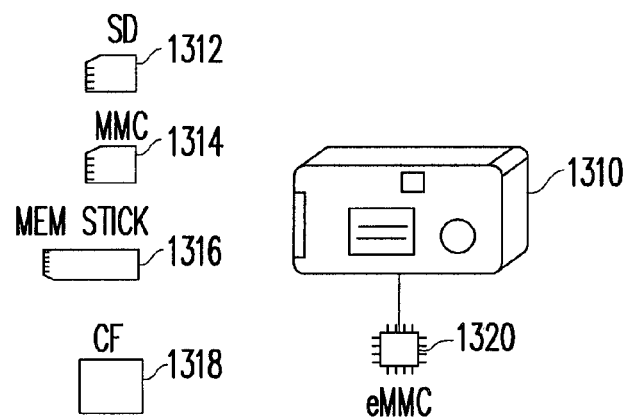
FIG. 1C illustrates a schematic view of a host system and a memory storage device according to an example embodiment.

Generally speaking, the host system 1000 may be any system that can substantively work with the memory storage device 100 to save the data. In the example embodiment, although the host system 1000 is described as a computer system, a host system 1000 in another example embodiment of the invention may be a system such as a digital camera, a video camera, a telecommunication device, an audio player, or a video player. For example, when the host system is a digital camera (video camera) 1310, the rewritable non-volatile memory storage device may be an SD card 1312, an MMC card 1314, a memory stick 1316, an CF card 1318, or an embedded storage device 1320 (as shown in FIG. 1C) used for the digital camera (video camera) 1310. The embedded storage device 1320 includes an embedded MMC (eMMC). It is worth mentioning that the eMMC is directly coupled on a substrate of the host system.

Figure 2A:
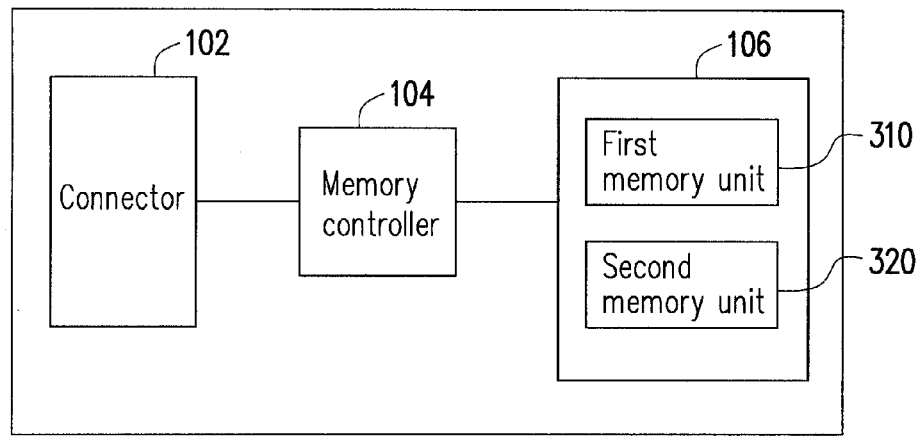
FIG. 2A illustrates a simple block diagram of the memory storage device shown in FIG. 1A.

FIG. 2A illustrates a simple block diagram of the memory storage device shown in FIG. 1A.

Please refer to FIG. 2A, the memory storage device 100 includes a connector 102, a memory controller 104, and a rewritable non-volatile memory module 106.

In the example embodiment, the connector 102 is compatible with Serial Advanced Technology Attachment (SATA) standard. However, it should be understood that the invention is not limited thereto. The connector 102 may also comply with Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, Secure Digital (SD) Interface standard, Ultra High Speed-I (UHS-I) Interface standard, Ultra High Speed-II (UHS-II) Interface standard, Memory Stick (MS) Interface standard, Multi Media Card (MMC) Interface standard, Embedded Multimedia Card (eMMC) Interface standard, Universal Flash Storage (UFS) Interface standard, Compact Flash (CF) Interface standard, Integrated Device Electronics (IDE) Interface standard or other suitable standards.

The memory controller 104 executes a plurality of logical gates or control commands practical in a hardware mode or firmware mode and carries out an operation such as data writing, reading, and erasing in the rewritable non-volatile memory module 106 according to a command of the host system 1000.

The rewritable non-volatile memory module 106 is coupled to the memory controller 104 and saves data written by the host system 1000. The rewritable non-volatile memory module 106 includes a first memory unit 310 and a second memory unit 320. The first memory unit 310 includes one die or a plurality of memory dice. Equally, the second memory unit 320 also includes one die or a plurality of memory dice. However, the first memory unit 310 and the second memory unit 320 have one pin or a plurality of pins, respectively, coupled to the memory controller 104. The memory controller 104 may transmit an enabling signal to these pins to respectively enable memory dice corresponding to the enabling pin location in the first memory unit 310 or the second memory unit 320.

Figure 2B:
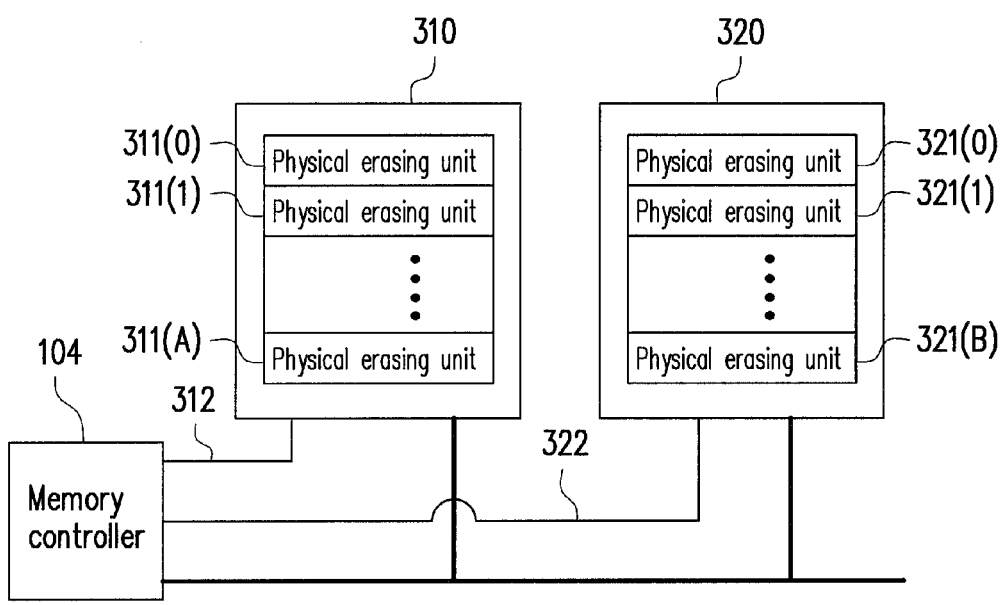
FIG. 2B specifies a coupling relation between a memory controller 104 and a rewritable non-volatile memory.

FIG. 2B specifies a coupling relation between a memory controller 104 and a rewritable non-volatile memory.

Please refer to FIG. 2B, the memory controller 104 may enable the first memory unit 310 via a signal 312 and may enable the second memory unit 320 via a signal 322. The memory controller 104 transmits data to the first memory unit 310 and the second memory unit 320 via a bus 330. When being enabled, the first memory unit 310 reads the data on the bus 330. Equally, when being enabled, the second memory unit 320 reads the data on the bus 330, wherein in the example embodiment, the first memory unit 310 and the second memory unit 320 are coupled to the same bus 330. However, in another example embodiment, the first memory unit 310 and the second memory unit 320 may be respectively coupled to a different bus 330, and are not limited thereto.

The first memory unit 310 includes physical erasing units 311(0)~311(A) (i.e. first physical erasing units). The second memory unit 320 includes physical erasing units 321(0)~321(B) (i.e. second physical erasing units). Each of the physical erasing units includes one or a plurality of physical programming unit(s). The physical programming units belonging to the same physical erasing unit may be written independently and be erased together. For example, each physical erasing unit is composed by 128 physical programming units. However, it should be understood that the invention is not limited thereto. Each physical erasing unit may be composed by 64 physical programming units, 256 physical programming units, or by any numbers of physical programming units.

Specifically, the physical erasing unit is the least unit being erased. That is to say, each physical erasing unit contains a least number of memory cells being erased together. The physical programming unit is the least unit being programmed, meaning that the physical programming unit is the least unit for data writing. For example, the physical erasing unit is a physical block and the physical programming unit is a physical page. In the example embodiment, the rewritable non-volatile memory module 106 is a multi level cell (MLC) NAND type flash memory module, that is, at least to two bits of data may be stored in a memory cell. In other words, a lower physical programming unit and an upper physical programming unit may be composed by a plurality of memory cells arranged on the same byte line. The lower physical programming unit and the upper physical programming unit compose a programming unit set. One physical erasing unit includes a plurality of physical programming unit sets, wherein the writing speed of the lower physical programming unit is greater than the writing speed of the upper physical programming unit.

On the other hand, there is an upper limit for the times of erasing for each physical erasing unit. When only the lower physical programming unit is used, the upper limit for the times of erasing is a first threshold value (for example, 50000 times). When the lower physical programming unit and the upper physical programming unit are used, the upper limit for the times of erasing is a second threshold value (for example, 5000 times). The second threshold value is smaller than the first threshold value. However, in other example embodiments, the rewritable non-volatile memory module 106 may be a single level cell (SLC) NAND type flash memory module, a trinary level cell (TLC) NAND type flash memory module, other flash memory modules, or other memory modules having similar characteristics.

Each physical programming unit (for example, the upper physical programming unit or the lower physical programming unit) usually includes a data bit area and a redundant bit area. The data bit area contains a plurality of physical access addresses storing a user's data, and the redundant bit area stores data of a system (for example, error checking and correction code). In the example embodiment, four physical access addresses are contained in the data bit area of each physical programming unit, and a size of one physical access address is 512 byte (B). However, in other example embodiments, the data bit area may contain 8, 16, a greater, or less number of physical access addresses. The invention is not limited to the size of the physical access address and the number thereof.

Figure 3:
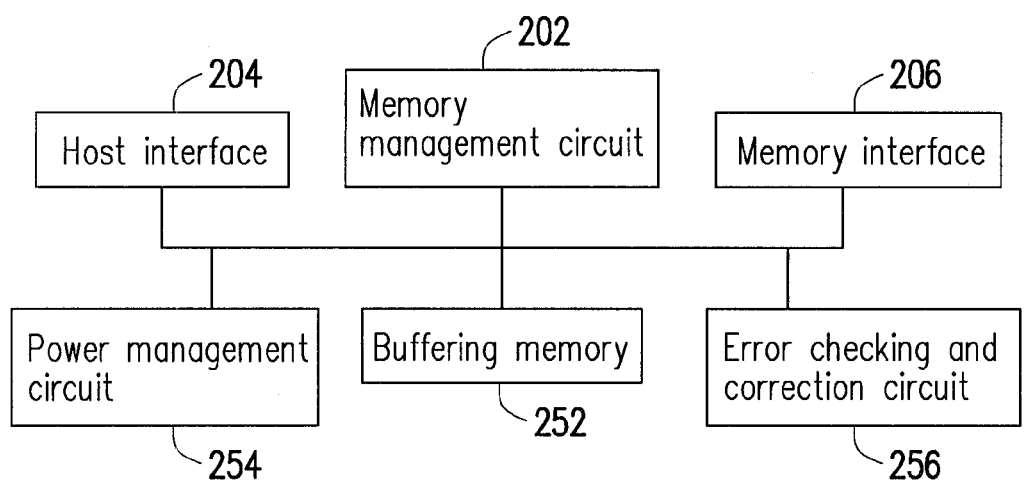
FIG. 3 illustrates a simple block diagram of a memory controller according to an example embodiment.

FIG. 3 illustrates a simple block diagram of a memory controller according to an example embodiment.

Please refer to FIG. 3, the memory controller 104 includes a memory management circuit 202, a host interface 204, and a memory interface 206.

The memory management circuit 202 controls an overall operation of the memory controller 104. Specifically, the memory management circuit 202 has a plurality of control commands. Moreover, when the memory storage device 100 is in operation, the control commands are executed to carry out an operation of data writing, reading, and erasing.

In the example embodiment, a control command of the memory management circuit 202 is practiced in a firmware mode. For example, the memory management circuit 202 has a microprocessor unit (not shown) and a read-only memory (not shown), and the control commands are burnt to the read-only memory. When the memory storage device 100 is in operation, the control commands are executed by the microprocessor unit to carry out the operation of data writing, reading, and erasing.

In another example embodiment of the invention, a control command of the memory management circuit 202 may be stored in a specific area of the rewritable non-volatile memory module 106 as a program code (for example, a system area in a memory module exclusively for saving system data). Besides, the memory management circuit 202 has a microprocessor unit (not shown), a read-only memory (not shown), and a random access memory (not shown). Moreover, the read-only memory has a drive code. When the memory controller 104 is enabled, the microprocessor unit first executes the drive code section to install the control command stored in the rewritable non-volatile memory module 106 to the random access memory of the memory management circuit 202, thereafter the microprocessor unit runs the control commands to carry out the operation of data writing, reading, and erasing.

Besides, in another example embodiment of the invention, the control command of the memory management circuit 202 may also be practiced in a hardware mode. For example, the memory management circuit 202 includes a micro controller, a memory management unit, a memory writing unit, a memory reading unit, a memory erasing unit, and a data processing unit. The memory management unit, the memory writing unit, the memory reading unit, the memory erasing unit, and the data processing unit are coupled to the micro controller, wherein the memory management unit manages a physical erasing unit of the rewritable non-volatile memory module 106, the memory writing unit gives a write command to the rewritable non-volatile memory module 106 to write a data to the rewritable non-volatile memory module 106, the memory reading unit gives a read command to the rewritable non-volatile memory module 106 to read the data in the rewritable non-volatile memory module 106, the memory erasing unit gives an erasing command to the rewritable non-volatile memory module 106 to erase the data from the rewritable non-volatile memory module 106, and the data processing unit processes a data to be written to the rewritable non-volatile memory module 106 and processes a data readable in the rewritable non-volatile memory module 106.

The host interface 204 is coupled to the memory management circuit 202, receiving as well as identifying a command and a data transmitted by the host system 1000. That is to say, the command and the data transmitted by the host system 1000 is transmitted to the memory management circuit 202 via the host interface 204. In the example embodiment, the host interface 204 is compatible with SATA standard. However, it should be understood that the invention is not limited thereto. The host interface 204 may also be compatible with PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable standards for data transmission.

The memory interface 206 is coupled to the memory management circuit 202, accessing the rewritable non-volatile memory module 106. That is to say, the data that is to be written to the rewritable non-volatile memory module 106 is transformed into a format that may be accepted by the rewritable non-volatile memory module 106 via the memory interface 206.

In an example embodiment of the invention, the memory controller 104 further includes a buffering memory 252, a power management circuit 254, and an error checking and correction circuit 256.

The buffering memory 252 is coupled to the memory management circuit 202, temporally storing the data and command from the host system 1000 or the data from the rewritable non-volatile memory module 106.

The power management circuit 254 is coupled to the memory management circuit 202, controlling power of the memory storage device 100.

The error checking and correction circuit 256 is coupled to the memory management circuit 202, executing an error checking and correction procedure to ensure the accuracy of the data. Specifically, when the memory management circuit 202 receives a write command from the host system 1000, the error checking and correction circuit 256 generates a corresponding error checking and correcting code (ECC code) for a data which corresponds to the write command. Moreover, the memory management circuit 202 writes the data which corresponds to the write command and the corresponding ECC code to the rewritable non-volatile memory module 106. Thereafter, when the memory management circuit 202 reads the data in the rewritable non-volatile memory module 106, the memory management circuit 202 reads the ECC code to which the data corresponds at the same time. Meanwhile, the error checking and correction circuit 256 executes the error checking and correction procedure on the read data according to the ECC code.

Figure 4:
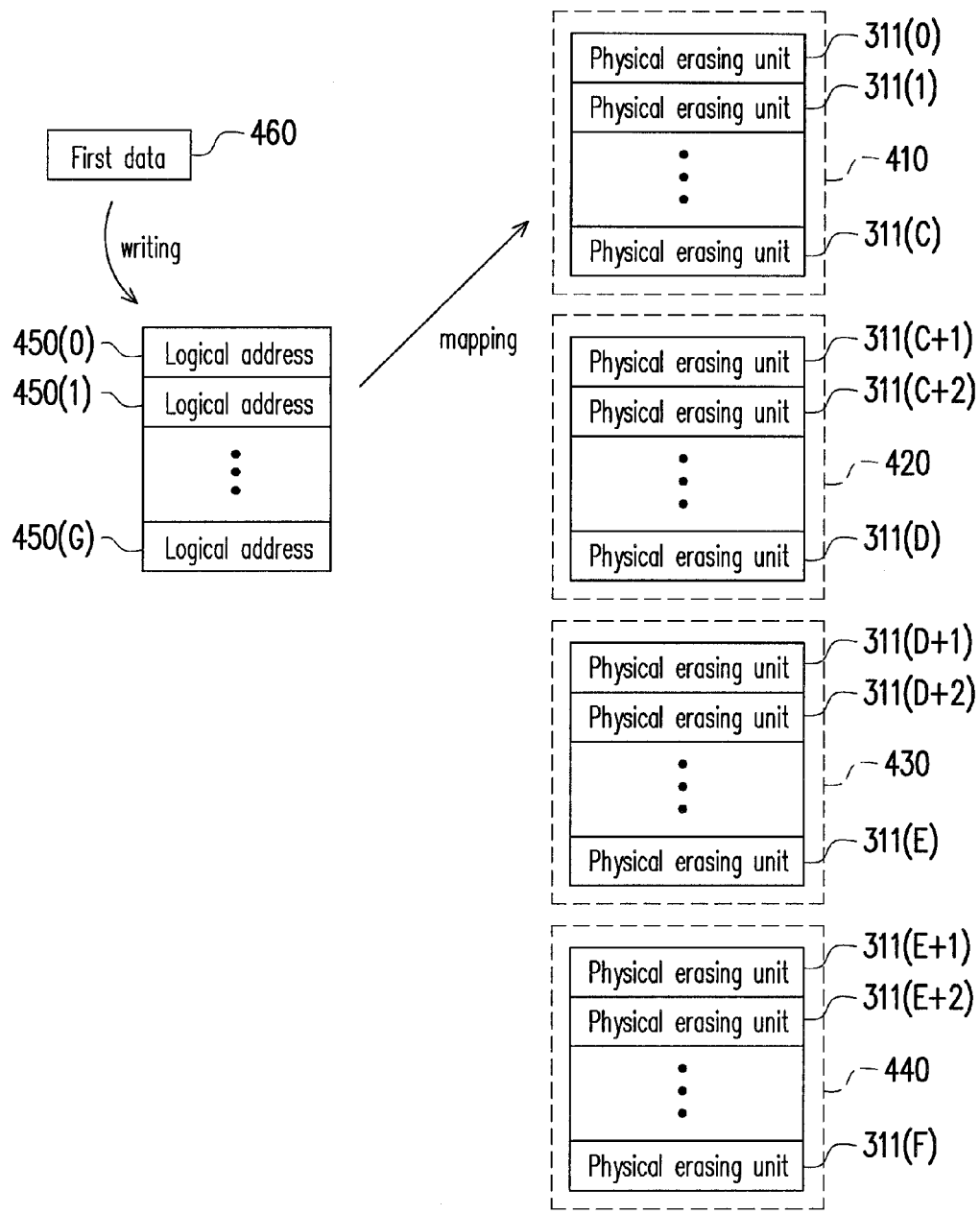
FIG. 4 illustrates an example schematic view of managing of a first memory unit according to an example embodiment.

FIG. 4 illustrates an example schematic view of managing of a first memory unit according to an example embodiment.

It should be understood that when an operation of the physical erasing unit of the rewritable non-volatile memory module 106 is described, terms such as "select," "group," "replace," and "associate" used to describe the manipulation of the physical erasing unit are logical concepts. In other words, an actual location of the physical erasing unit of the rewritable non-volatile memory module does not change. Instead, the manipulation of the physical erasing unit of the rewritable non-volatile memory module is carried out logically.

Please refer to FIG. 4. The memory controller 104 may logically group the physical erasing units 311(0)~311(A) of the first memory unit 310 into a plurality of areas, for example, a data area 410, a spare area 420, a system area 430, and a replace area 440. In another example embodiment, the replace area 440 may also share a physical erasing unit containing an invalid data with the spare area 420. In the specification, "a physical erasing unit associated with an area" is equivalent to "a physical erasing unit grouped into the area" and "a physical erasing unit of the area."

The physical erasing units of the data area 410 and the spare area 420 stores the data from the host system 1000. Specifically, the data area 410 includes physical erasing units which have already stored the data, and the spare area 420 includes physical erasing units for replacing the data area 410. Therefore, the physical erasing units of the spare area 420 are empty or usable physical erasing units, i.e. data with no records or invalid data being marked not in use. That is to say, an erase operation has already been executed to the physical erasing units of the spare area 420. Or, before a physical erasing unit in the spare area 420 is selected for storing the data, the erase operation is executed to the selected physical erasing unit first. Accordingly, the physical erasing units of the spare area 420 are usable physical erasing units.

A physical erasing unit which logically belongs to the system area 430 records system data, wherein the system data includes data such as a manufacturer of a memory chip, a model number thereof, a number of the physical erasing units of the memory chip, a number of the physical programming units of each physical erasing unit.

A physical erasing unit which logically belongs to the replace area 440 is a replacing physical erasing unit. For example, 4% of the physical erasing units are preserved for replacement after the rewritable non-volatile memory module is manufactured. That is to say, when the physical erasing unit in the data area 410, the spare area 420, and the system area 430 is damaged, the physical erasing unit preserved in the replace area 440 replaces the damaged physical erasing unit (i.e. a bad erasing unit). Accordingly, when damage to the physical erasing unit takes place and there is still a normal physical erasing unit in the replace area 440, the memory controller 104 selects the normal physical erasing unit from the replace area 440 to replace the bad physical erasing unit. When damage to the physical erasing unit takes place and there is no normal physical erasing unit in the replace area 440, then the memory controller 104 claims the whole memory storage device 100 to be in a write protect condition and no more data can be written thereto.

Specifically, a number of the physical erasing units in the data area 410, the spare area 420, the system area 430, and the replace area 440 varies according to different memory specifications. Besides, it should be understood that in an operation of the memory storage device 100, a grouping relation that the physical erasing unit associated with the data area 410, the spare area 420, the system area 430, and the replace area 440 changes dynamically. For example, when the physical erasing unit in the spare area is damaged and replaced by the physical erasing unit in the replace area, the physical erasing unit previously in the replace area is associated with the spare area.

In the example embodiment, logical addresses 450(0)~450(G) are configured by the memory controller 104. For example, when the memory storage device 100 is formatted by an operating system on the host system 1000 through a file system (for example, FAT 32), the logical addresses 450(0)~450(G) are respectively mapped to the physical erasing units 311(0)~311(C) in the data area 410. In the specification, the memory management circuit 202 builds up a logical block address-physical erasing unit mapping table to record a mapping relation between the logical addresses and the physical erasing units.

The host system 1000 accesses data through the logical addresses 450(0)~450(G). For example, the host system 1000 gives a write command to the memory management circuit 202. The write command instructs to write a first data 460 to the logical address 450(0). The logical address 450(0) is mapped to the physical erasing unit 311(0). That is, the host system 1000 accesses the data stored in the physical erasing unit 311(0) through accessing the logical address 450(0). After the memory management circuit 202 receives the write command, the memory management circuit 202 writes the first data 460 to a physical erasing unit 311(C+1) in the spare area 450. Thereafter, at an appropriate timing, the memory management circuit 202 executes a data merging procedure on a valid data related to the first data 460 and the first data 460 to merge valid data belong to the logical address 450(0). Specifically, the memory management circuit 202 copies the valid data (i.e. the valid data for the logical address 450(0)) related to the first data 460 in the physical erasing unit 311(0) to the physical erasing unit 311(C+1), erases the physical erasing unit 311(0), associates the physical erasing unit 311(0) with the spare area 420, associates the physical erasing unit 311(C+1) with the data area 410, and re-maps the logical address 450(0) to the physical erasing unit 311(C+1).

Besides, the memory management circuit 202 also writes the first data 460 to a physical erasing unit in the second memory unit 320. That is to say, the second memory unit 320 backs up the first data 460. When the first data 460 in the first memory unit 310 is missing, the memory management circuit 202 reads the first data 460 in the second memory unit 320 and rewrites the first data 460 to a physical erasing unit in the first memory unit 460. Specifically, in the example embodiment, the second memory unit 320 does not have to carry out the aforementioned data merging procedure. In other words, the valid data related to the first data 460 in the second memory unit 320 is not merged together with the first data 460 to the same physical erasing unit. The memory management circuit 202 records the write command given by the host system 1000 and the first data 460 in the second memory unit 320 and utilizes information of the write command to resume the first data 460.

Figure 5:
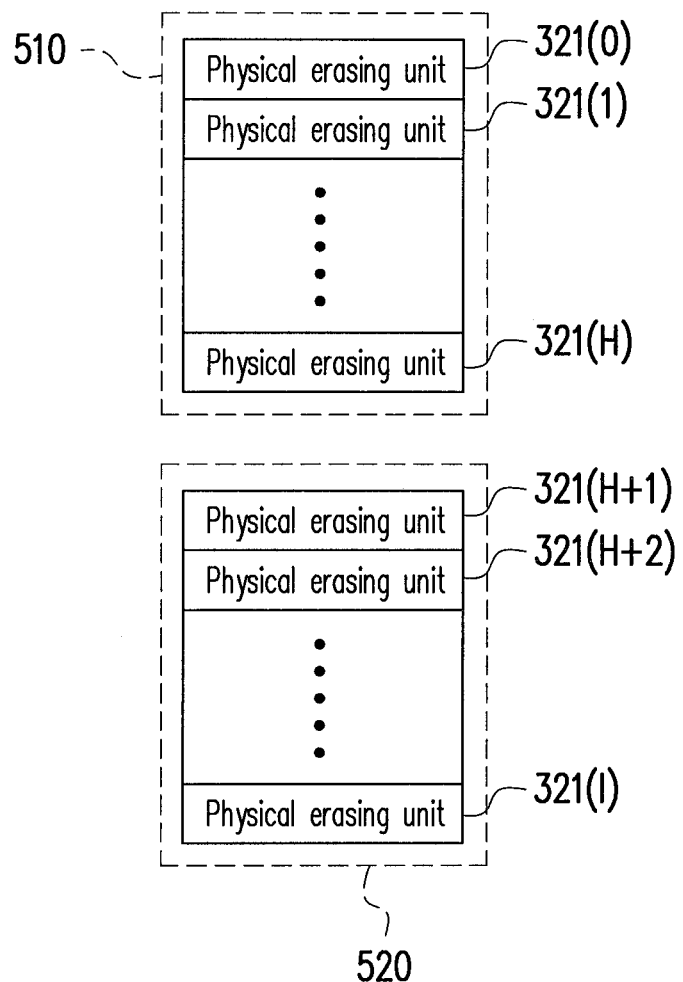
FIG. 5 is a schematic view specifying the management of a second memory unit according to an example embodiment.

FIG. 5 is a schematic view specifying management of a second memory unit according to an example embodiment.

Please refer to FIG. 5. The memory management circuit 202 groups the physical erasing units 321(0)~321(B) into a data backup area 510 and a command recording area 520. The data backup area 510 backs up a data written to the first memory unit 310 by the host system 1000. The command recording area 520 records the write command given by the host system 1000.

Figure 6:
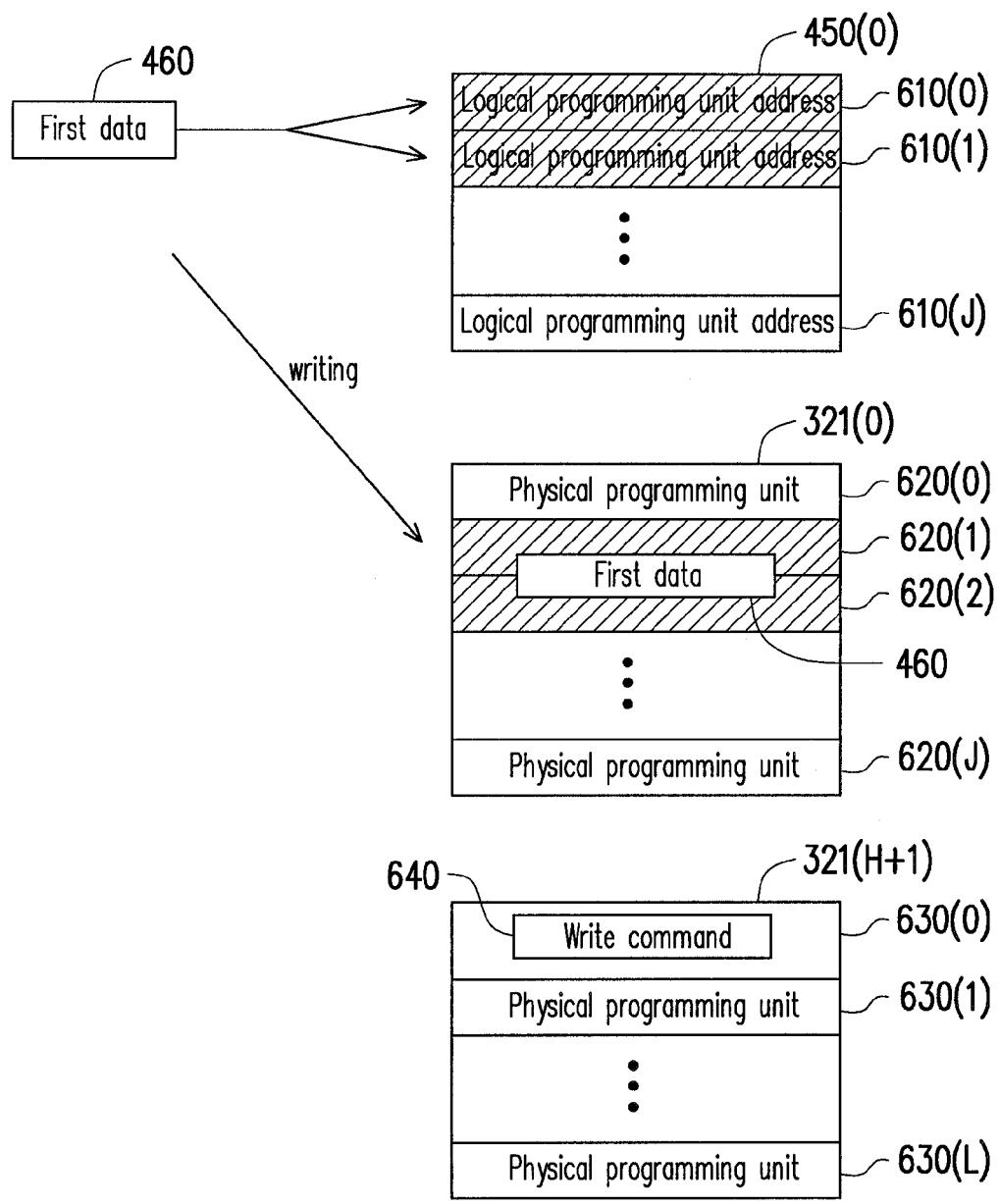
FIG. 6 is a schematic view specifying the backup of a first data according to an example embodiment.

FIG. 6 is a schematic view specifying the backup of a first data according to an example embodiment.

Please refer to FIG. 6. The logical address 450(0) includes logical programming unit addresses 610(0)~610(J). The physical erasing unit 321(0) includes physical programming units 620(0)~620(J). The physical erasing unit 321(H+1) includes physical programming units 630(0)~630(L). One logical programming unit address is mapped to one physical programming unit. The host system 1000 gives a write command to the memory management circuit 202 to write the first data 460 to the logical programming unit addresses 610(0) and 610(1). In other words, a data length of the first data 460 is a size of two physical programming units. In the specification, the data length also represents a data volume of the first data 460. In addition to writing the first data 460 to the physical erasing unit in the first memory unit 310, the memory management circuit 202 also writes the first data 460 to physical programming units 620(1) and 620(2) of the physical erasing unit 321(0) (i.e. a third physical erasing unit). Moreover, the memory management circuit 202 records at least a portion of the write command of writing the first data 460 instructed by the host system 1000 in the physical programming unit 630(0) to be a write command 640. When the first data 460 in the first memory unit 310 is missing, the memory management circuit 202 reads the write command 640 and rewrites the first data 460 to the first memory unit 310 according to the write command 640.

In an example embodiment, the write command 640 may include an initial physical address of the physical erasing unit 321(0) and the data length of the first data 460. The initial physical address is an address of the first data 460 which begins to be written in the second memory unit 320. In the example embodiment, the initial physical address is a physical address of the physical programming unit 620(1). However, in other embodiments, the initial physical address of the physical erasing unit 321(0) may also be a physical fan or a physical address of a physical erasing unit.

In an example embodiment, the memory management circuit 202 records an initial logical address of a logical address 450(0). The host system 1000 instructs to begin to write the first data 460 from the initial logical address. For example, the initial logical address is the logical programming unit address 610(0). The initial logical address may be regarded as a portion of the write command 640 to be recorded in the physical programming unit 630(0) or may be regarded as a portion of the first data 460 to be recorded in a redundant bit area in the physical programming unit 620(1). The invention is not limited thereto. In another example embodiment, an initial logical address of the logical address 450(0) may also be a logical fan address or a logical address.

When resuming the first data 460, the memory management circuit 202 reads the initial physical address of the physical erasing unit 321(0) in the physical erasing unit 321(H+1) and reads the data length of the first data 460. According to the initial physical address, the memory management circuit 202 finds the first data 460 in the second memory unit 320. Further according to the data length, the memory management circuit 202 reads the first data 460 in the physical erasing unit of the second memory unit 320. In an example embodiment, the memory management circuit 202 also reads the initial logical address of the logical address 450(0), and re-builds a write command according to the initial logical address, the first data 460, and the data length. The memory management circuit 202 transmits the re-built write command to an application on the host system 1000. The application gives the re-built write command to write the first data 460 to the first memory unit 310. In another example embodiment, the memory management circuit 202 may also write the first data 460 to the physical erasing unit of the first memory unit 310 by itself according to the read data length without involving the host system 1000.

In an example embodiment, the memory management circuit 202 only uses lower physical programming units of the physical erasing unit 321(H+1) to record the write command 640 (i.e. all the physical programming units 630(0)~630(L) are lower physical programming units). That is, the memory management circuit 202 sets the upper physical programming units of the physical erasing unit 321(H+1) to be non-programmable. Since when only the lower physical programming units in the physical erasing unit are programmed, the data stored by the physical erasing unit is less likely to be missing (in comparison with that both of the lower physical programming units and the upper physical programming units are programmed), the write command 640 is less likely to be missing.

In other example embodiments, the recorded write command 640 may also include time when the first data 460 is written or include information regarding whether the first data 460 has been accurately written to the first memory unit 310. The invention is not limited thereto.

The memory management circuit 202 executes a wear-leveling procedure (i.e. a first wear-leveling procedure) on the physical erasing units 311(0)~311(A) of the first memory unit 310 and also executes another wear-leveling procedure (i.e. a second wear-leveling procedure) on the physical erasing units 321(0)~321(B) of the second memory unit 320. In other words, the first wear-leveling procedure is different from the second wear-leveling procedure. The wear-leveling procedure moves data with high accessing frequency to a physical erasing unit with less times of erasing. Therefore, data stored in the two physical erasing units are exchanged. In the example embodiment, when being executed with the wear-leveling procedure, an exchanging frequency between the physical erasing units 311(0)~311(A) is higher than an exchanging frequency between the physical erasing units 321(0)~321(B). The exchanging frequency refers to a data exchanging frequency.

In the example embodiment, the memory management circuit 202 simultaneously writes the first data 460 to the first memory unit 310 and the second memory unit 320 with a two-plane method. Therefore, the memory management circuit 202 separates the first data 460 into a first portion and a second portion. In another example embodiment, the memory management circuit 202 respectively writes the first data 460 to the first memory unit 310 and the second memory unit 320 with a normal method.

Please refer back to FIG. 2B. First of all, the memory management circuit 202 enables the first memory unit 310, disables the second memory unit, and transmits a first command to the first memory unit 310. The first command notifies the first memory unit 310 that the first portion is to be written. Following that, the memory management circuit 202 transmits a physical address to the first memory unit 310 via the bus 330. The physical address represents that the first portion is to be written to which physical erasing unit in the first memory unit 310. At this moment, since the second memory unit 320 is disabled, the second memory unit does not receive the physical address.

Next, the memory management circuit 202 enables the second memory unit 320 and disables the first memory unit 310. Then, the memory management circuit 202 transmits the first command to the second memory unit 320. Similarly, the memory management circuit 202 transmits a physical address to the second memory unit 320. The physical address represents that the first portion is to be written to which physical erasing unit in the second memory unit 320. Therefore, the first memory unit 310 and the second memory unit 320 receive a different physical address.

After receiving the first command, the first memory unit 310 and the second memory unit 320 are ready to receive a data from the bus 330. Following that, the memory management circuit 202 (simultaneously or respectively) transmits the first portion to the first memory unit 310 and the second memory unit 320 via the bus 330. In other words, at this moment the first memory unit 310 and the second memory unit 320 (simultaneously or respectively) receive the same data.

Next, the memory management circuit 202 (simultaneously or respectively) enables the first memory unit 310 and the second memory unit 320 and (simultaneously or respectively) transmits a second command to the first memory unit 310 and the second memory unit 320. The second command corresponds to the first command and represents that a transmission of the first portion is complete. It should be noted that at this moment the first portion is stored in a temporary memory in the first memory unit 310 and the second memory unit 320 and is not written to the physical erasing unit.

Next, the memory management circuit 202 enables the first memory unit 310, disables the second memory unit 320, and transmits a third command to the first memory unit 310. The third command represents that the second portion is to be written. The memory management circuit 202 transmits a physical address to the first memory unit 310 to represent that the second portion is to be written to which physical erasing unit in the first memory unit 310.

Then, the memory management circuit 202 enables the second memory unit 320, disables the first memory unit 310, and transmits the third command to the second memory unit 320. The memory management circuit 202 transmits a physical address to the second memory unit 320 to represent that the second portion is to be written to which physical erasing unit in the second memory unit 320.

After receiving the third command, the first memory unit 310 and the second memory unit 320 are ready to receive a data from the bus 330. Following that, the memory management circuit 202 (simultaneously or respectively) transmits the second portion to the first memory unit 310 and the second memory unit 320 via the bus 330.

Finally, the memory management circuit 202 enables the first memory unit 310 and the second memory unit 320 and (simultaneously or respectively) transmits a fourth command to the first memory unit 310 and the second memory unit 320. The fourth command instructs the first memory unit 310 and the second memory unit 320 to write the first portion and the second portion to a corresponding physical erasing unit. Therefore, the first data 460 is (simultaneously or respectively) written to the first memory unit 310 and the second memory unit 320. Moreover, the first data 460 is only transmitted once on the bus 330, thereby decreasing to a demand of a bandwidth of the bus 330.

In another example embodiment, the memory management circuit 202 may also (simultaneously or respectively) write the first data 460 to the first memory unit 310 and the second memory unit 320 with a one-plane method. In other words, at this moment the first data 460 is not separated into the first portion and the second portion.

Every time after the host system 1000 gives a write command, the memory management circuit 202 writes a corresponding data to the first memory unit 310 and back up the corresponding data to the second memory unit 320. If there is no more usable physical erasing unit in the second memory unit 320, the memory management circuit 202 erases a portion of the physical erasing units in the second memory unit 320.

Figure 7:
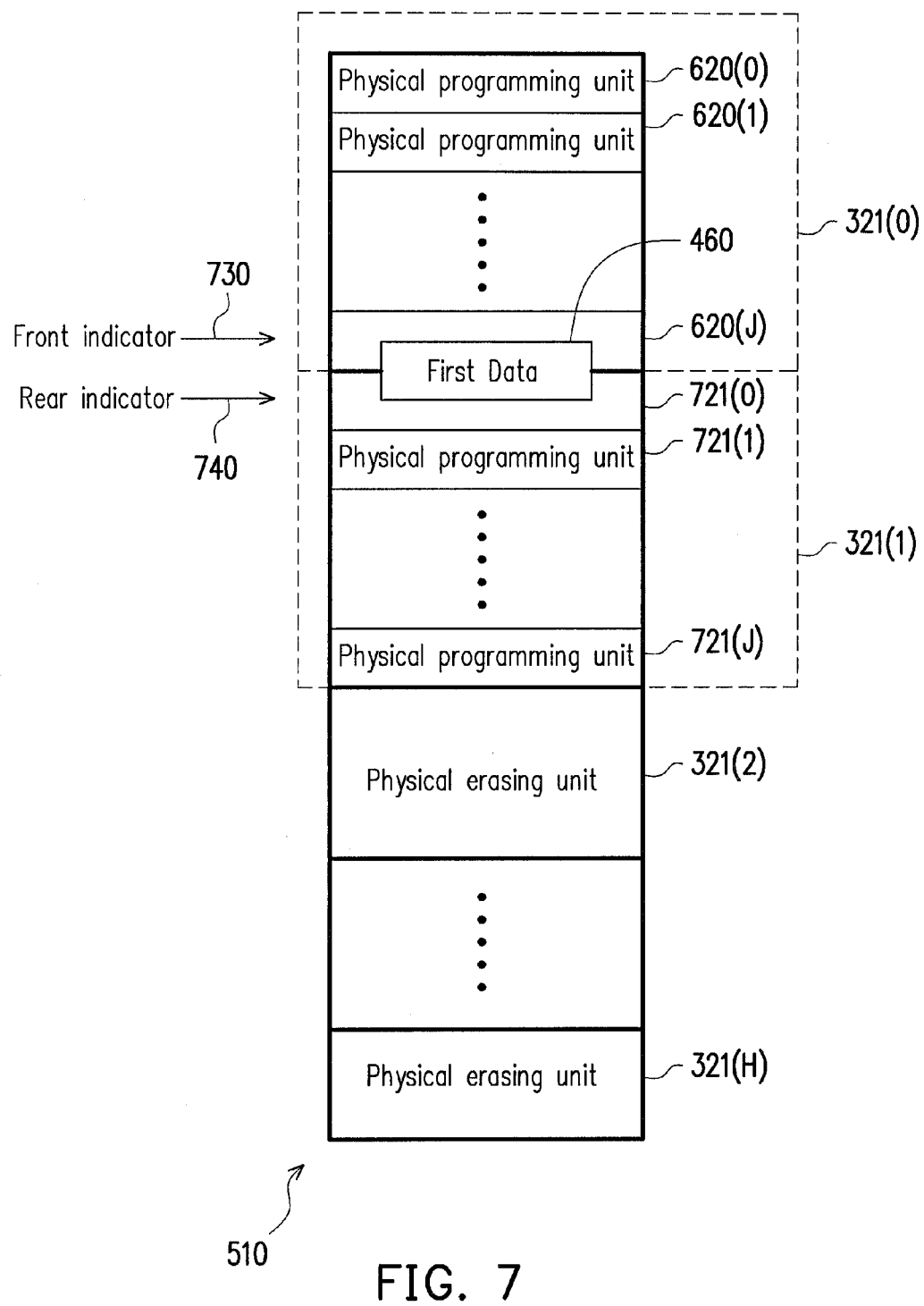
FIG. 7 is an example schematic view specifying the erasing of a physical erasing unit in a data backup area according to an example embodiment.

FIG. 7 is an example schematic view specifying the erasing of a physical erasing unit in a data backup area according to an example embodiment.

Please refer to FIG. 7, in the data backup area 510, the memory management circuit 202 sets a programming sequence of the physical erasing unit 321(0) before the physical erasing unit 321(2) and sets a programming sequence of the physical erasing unit 321(1) before a physical erasing unit 321(2). The physical erasing unit 321(1) includes physical programming units 721(0)~721(J). The memory management circuit 202 builds up a front indicator 730 indicating a physical programming unit 620(J) in the physical erasing unit 321(0) (i.e. the fourth physical erasing unit). That is, the front indicator 730 is represented by a physical address of the physical programming unit 620(J). When the first data 460 is to be backed up, the front indicator 730 indicates a first physical programming unit which the first data 460 begins to store. In addition, the memory management circuit 202 also builds up a rear indicator 740 indicating the physical erasing unit 321(1) (i.e. the fifth physical erasing unit). In other words, the rear indicator 740 represents a physical address of the physical erasing unit 321(1). In the example embodiment, a physical address of the physical erasing unit 321(1) is also a physical address in the first physical programming unit 721(0).

When the first data 460 is to be backed up, the memory management circuit 202 begins writing the first data 460 from the physical programming unit 620(J) indicated by the front indicator 730. Moreover, the memory management circuit 202 determines whether a spare memory space in the physical erasing units 321(0)~321(H) is adequate for writing the first data 460. The spare memory space represents a memory space of physical erasing units which have already been erased and can be used for writing new data. It is assumed that the spare memory space only includes the physical programming unit 620(J). When the spare memory space is inadequate for writing the first data 460, the memory management circuit 202 erases the physical erasing unit 721(0) indicated by the rear indicator 740, thereby the memory management circuit 202 may write the first data 460 consecutively to the physical programming unit 721(0). Moreover, the memory management circuit 202 moves the rear indicator 740 to another physical erasing unit (for example, the physical erasing unit 321(H)).

It should be noted that, in another example embodiment, before the first data 460 is backed up, the rear indicator 740 may indicate the physical erasing unit 321(2). Therefore, if the spare memory space is inadequate for writing the first data 460, the first data 460 is respectively written to the physical programming unit 620(J) and the physical erasing unit 321(2). The invention is not limited thereto.

In the example embodiment, all the physical programming units in the physical erasing units 321(0)~321(H) are represented as consecutive physical addresses. The front indicator 730 indicates a physical programming unit which the first data 460 begins to be written in, and the rear indicator 740 indicates a physical programming unit which the first data 460 cannot be written in. In other words, the physical programming unit between the front indicator 730 and the rear indicator 740 is an area which the first data 460 can be written in. The memory management circuit 202 determines that whether a sum of the physical address represented by the front indicator 730 and the data length of the first data 460 is greater than a physical address represented by the rear indicator 740, thereby determining whether a physical erasing unit is to be erased. For example, the data length of the first data 460 is the size of two physical programming units. Therefore, the sum of the physical address of the physical programming unit 620(J) and the data length of the first data 460 becomes a physical address of the physical programming unit 721(1). The memory management circuit 202 determines that the physical address of the physical programming unit 721(1) is greater than the physical address of the physical erasing unit 321(1). At this moment, the memory management circuit 202 moves the rear indicator 740 to the physical erasing unit 321(2) (i.e. the sixth physical erasing unit) and erases the physical erasing unit 321(1). Following that, the memory management circuit 202 writes the first data 460 to the physical programming units 620(J) and 721(0) and moves the front indicator 740 to the physical programming unit 721(1).

It should be noted that when the rear indicator 740 indicates the physical erasing unit 321(H), if the memory management circuit 202 determines that the rear indicator 740 is to be further moved, then the rear indicator 740 is moved to the physical erasing unit 321(0). In other words, the data backup area 510 stores data in cycles. When there is no more usable physical erasing unit in the data backup area 510, the oldest data is removed.

In another example embodiment, when the memory management circuit 202 determines that a quantity of data to be written is greater than a quantity of data which can be written in the physical programming unit indicated by the front indicator 730, the memory management circuit 202 looks for another physical erasing unit (for example, an erased physical erasing unit) to which a data may be written among the physical erasing units 321(0)~321(H), then moves the rear indicator 740 to another physical erasing unit to which the data may be written, and moves the front indicator 730 to a physical programming unit following the first data 460.

Figure 8:
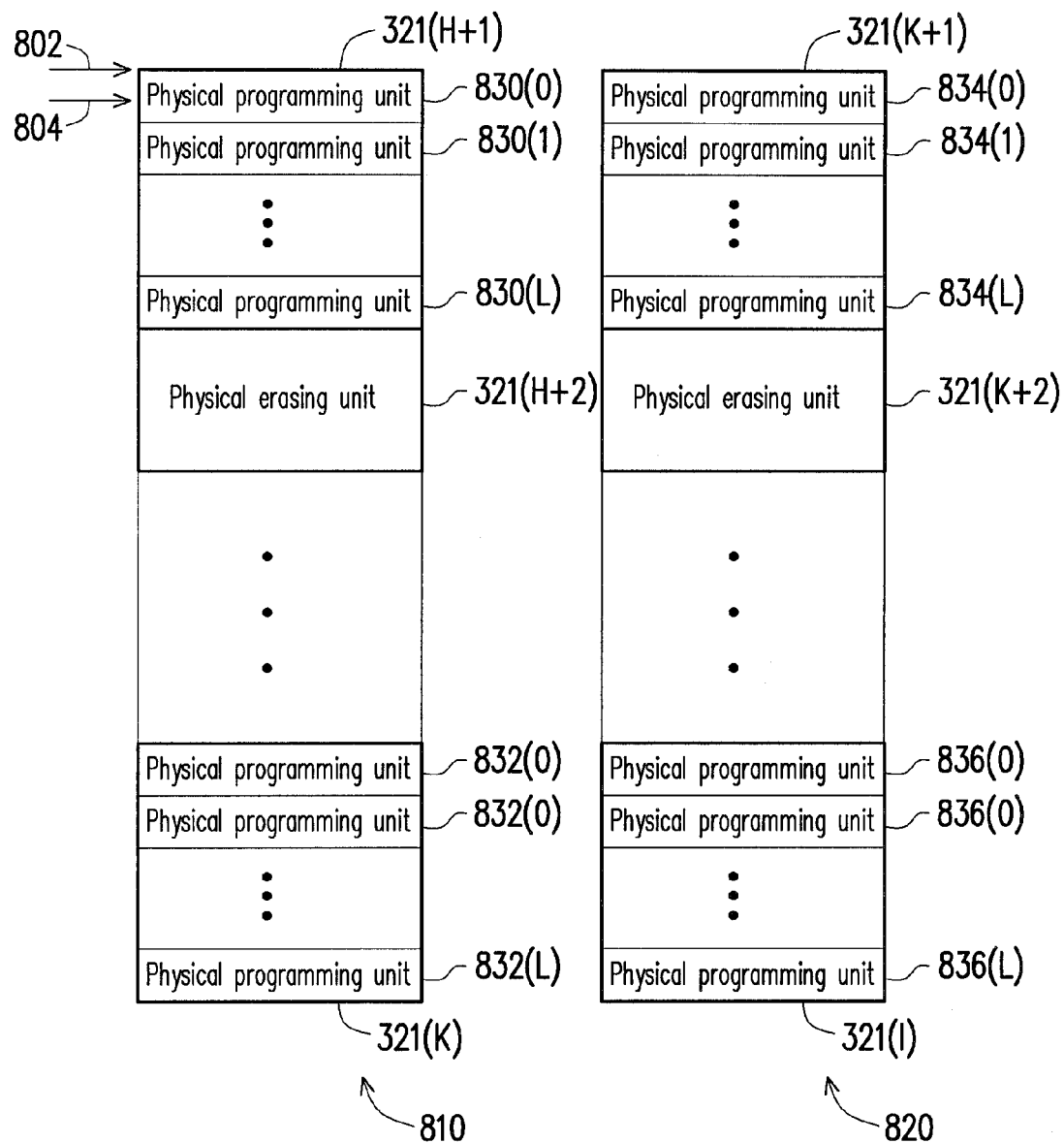
FIGS. 8-10 are example schematic views specifying the erasing of a physical erasing unit in a command recording area according to an example embodiment.
Figure 9:
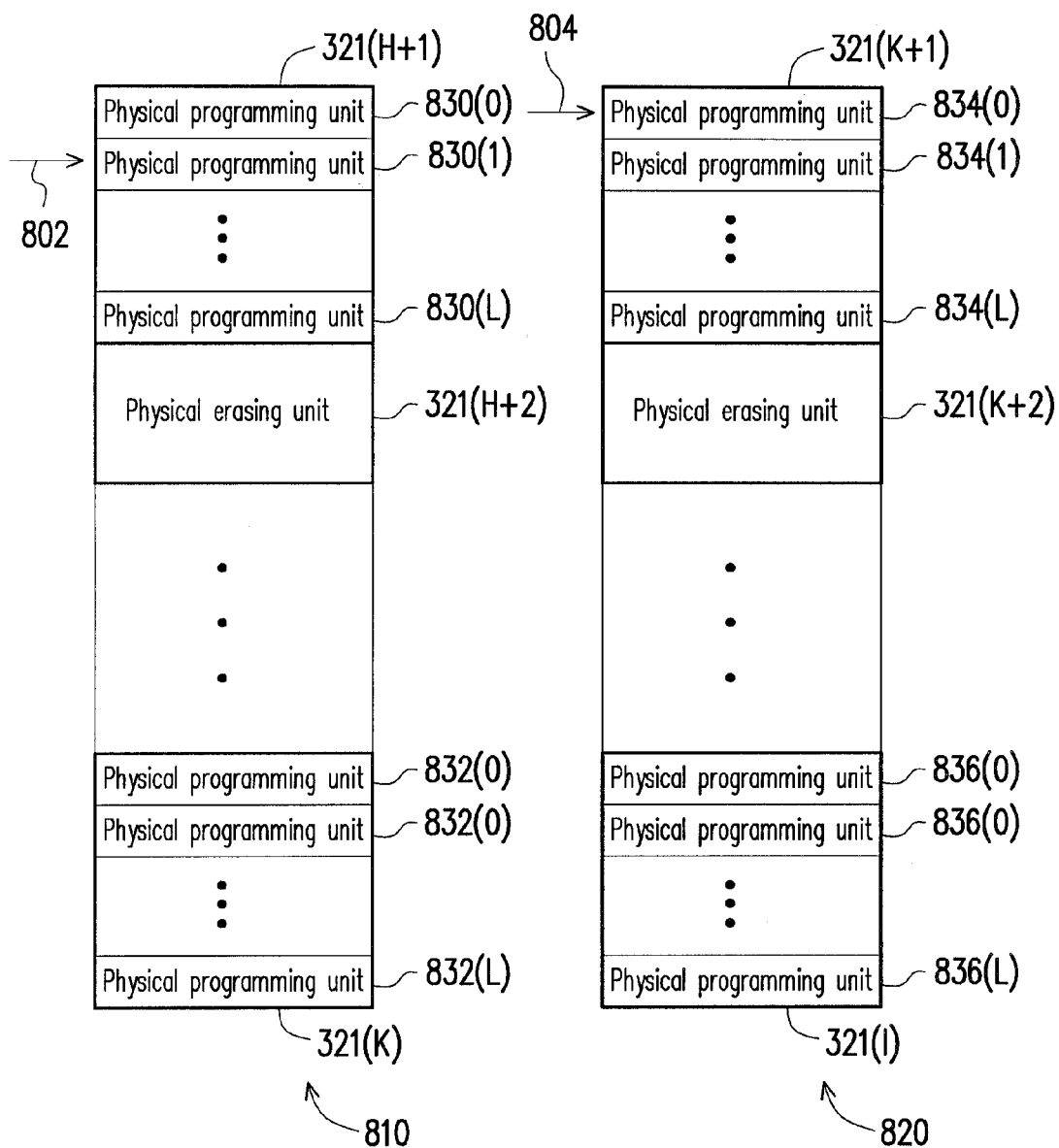
Figure 10:
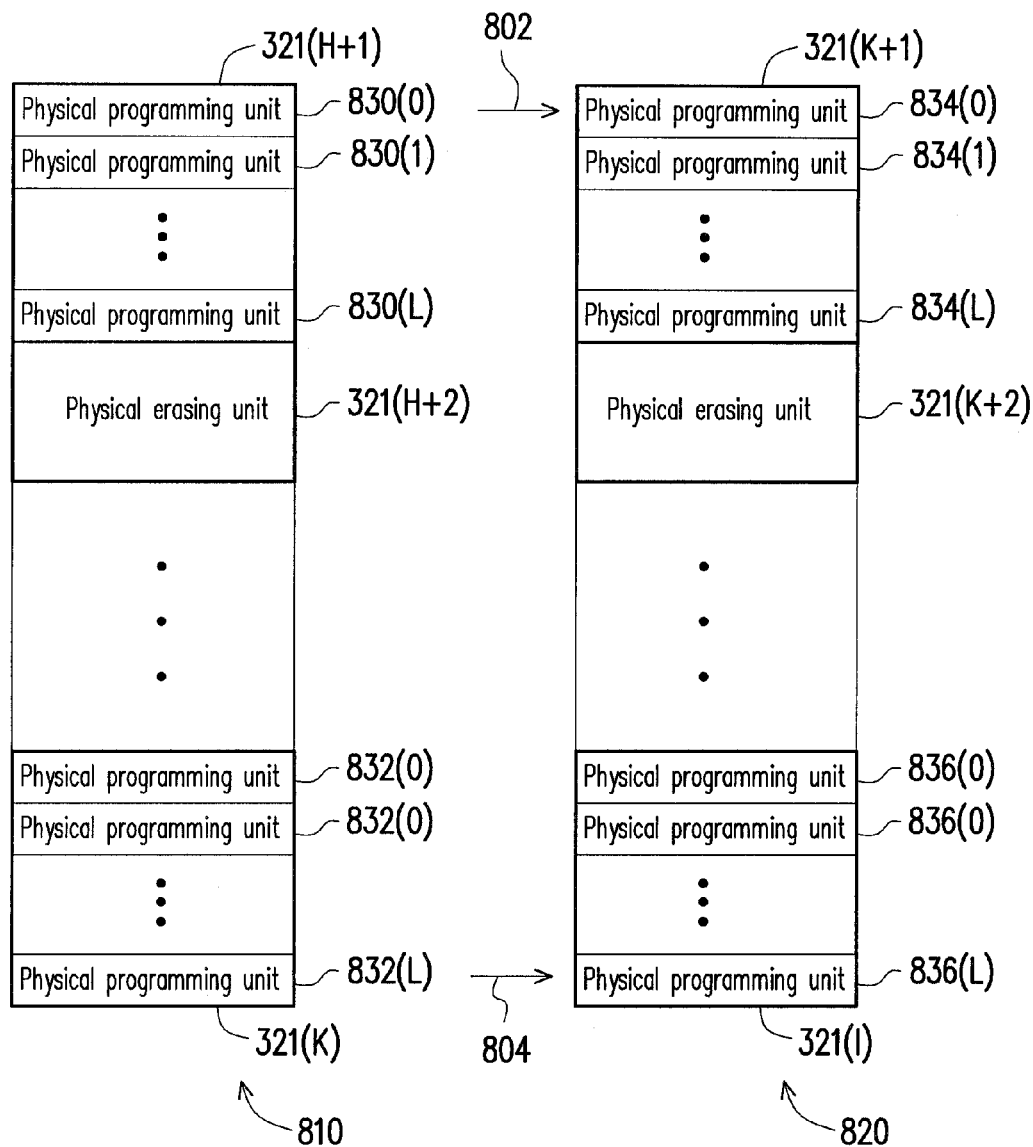

FIGS. 8-10 are example schematic views specifying the erasing of a physical erasing unit in a command recording area according to an example embodiment Please refer to FIG. 8, the memory management circuit 202 groups the physical erasing units in the command recording area into a first command recording area 810 and a second command recording area 820. In the example embodiment, a size of the first command recording area 810 is equivalent to a size of the second command recording area 820. The first command recording area 810 includes physical erasing units 321(H+1)~321(K). The second command recording area 820 includes physical erasing units 321(K+1)~321(I). The physical erasing unit 321(H+1) includes physical programming units 830(0)~830(L). The physical erasing unit 321(K) includes physical programming units 821(0)~821(L). The physical erasing unit 321(K+1) includes physical programming units 834(0)~834(L). The physical erasing unit 321(I) includes physical programming units 836(0)~836(L).

The memory management circuit 202 builds up a first indicator 802 and a second indicator 804. When there is no valid data stored in the command recording area 520, both of the first indicator 802 and the second indicator 804 indicate the physical programming unit 830(0). When the memory management circuit is to record a write command in the command recording area 520, the memory management circuit records the write command in a physical programming unit indicated by the second indicator 804 and moves the second indicator 804 to next physical programming unit. For example, the second indicator 804 is moved from the physical programming unit 830(0) to the physical programming unit 832(L). When the second indicator 804 is moved to the physical programming unit 832(L), which means that there is no usable physical erasing unit in the first command recording area 810. At this moment, if a write command is further received, then the memory management circuit 202 moves the second indicator to the physical programming unit 834(0) and moves the first indicator to 830(1) (as shown in FIG. 9). In other words, when there is no usable physical programming unit in the first command recording area 810, the memory management circuit 202 (simultaneously or respectively) moves the first indicator 802 and the second indicator 804.

Please refer to FIG. 10. According the aforementioned ways of moving, when the second indicator 804 is moved to the physical programming unit 836(L), the first indicator 802 is moved to the physical programming unit 834(0). At this moment, the memory management circuit 202 determines that both of the first indicator 802 and the second indicator 804 indicate the second command recording area 820. The memory management circuit 202 erases at least one physical erasing unit (or all the physical erasing units) in the first command recording area 810. As a result, the first command recording area 810 may record other write commands.

It should be noted that, then the second indicator 804 is moved from the physical programming unit 836(L) to the physical programming unit 830(0). In other words, the first command recording area 810 and the second command recording area 820 are used interchangeably. In another example embodiment, the size of the first command recording area 810 may be different from the size of the second command recording area 820. The invention is not limited thereto.

In an example embodiment, the memory management circuit 202 also records the first indicator 802, the second indicator 804, the front indicator 730, and the rear indicator 740 in a physical erasing unit in the system area 430. When the power supply of the memory storage device 100 is cut off, those indicators are not missing.

In another example embodiment, when there is no usable physical erasing unit in the second memory unit 320, the memory management circuit 202 stops backing up the data. At this moment, the data which is to be written by the host system 1000 is written to only the first memory unit 310. When there is a usable physical erasing unit in the second memory unit 320 for recording a data and a write command, the memory management circuit 202 begins to back up.

Figure 11:
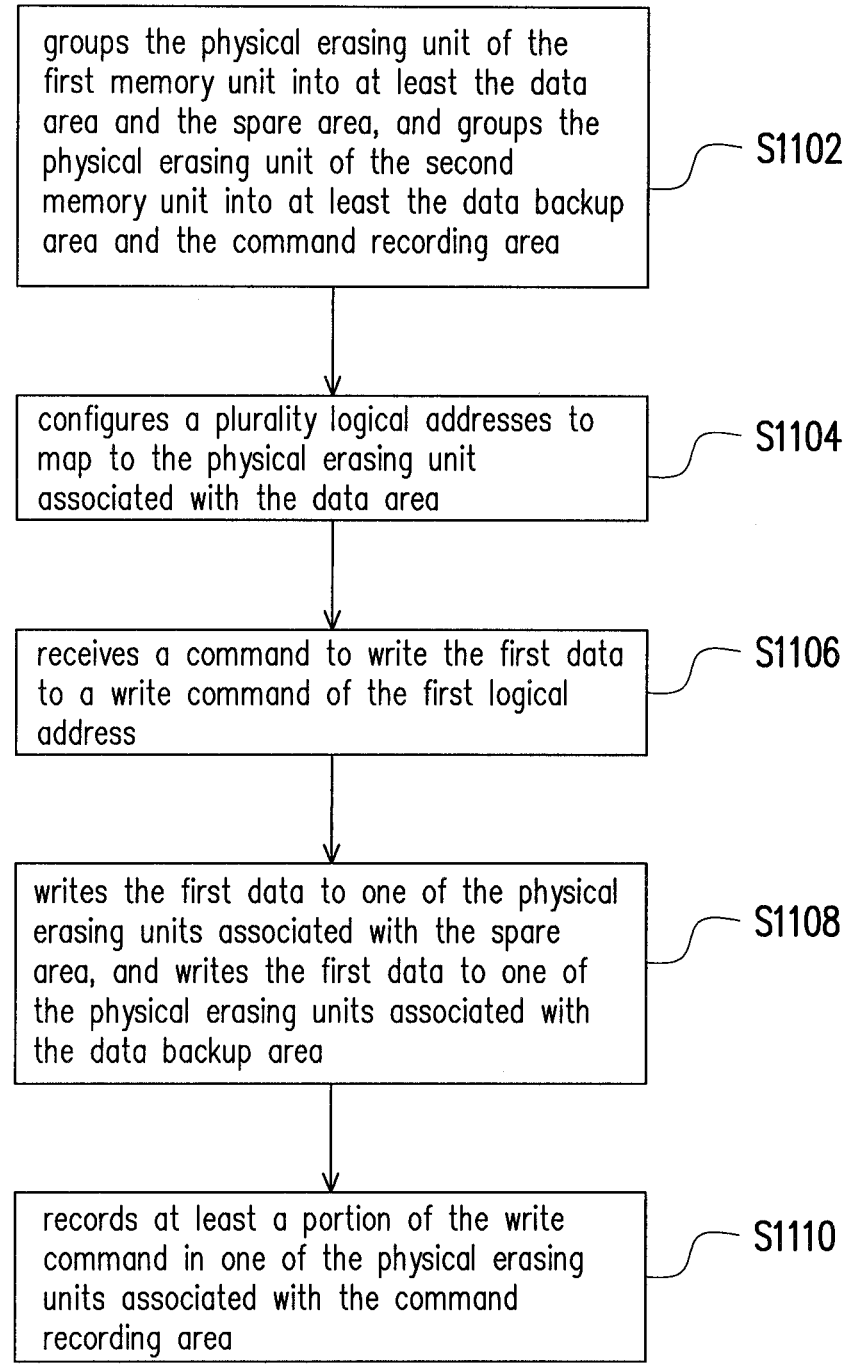
FIG. 11 is a flow chart specifying a data management method according to an example embodiment.

FIG. 11 is a flow chart specifying a data management method according to an example embodiment.

Please refer to FIG. 11. In a step S1102, the memory management circuit 202 groups the physical erasing unit of the first memory unit into at least the data area and the spare area, and groups the physical erasing unit of the second memory unit into at least the data backup area and the command recording area.

In a step S1104, the memory management circuit 202 configures a plurality logical addresses to map to the physical erasing unit associated with the data area.

In a step S1106, the memory management circuit 202 receives a command to write the first data to a write command of the first logical address.

In a step S1108, the memory management circuit 202 writes the first data to one of the physical erasing units associated with the spare area, and writes the first data to one of the physical erasing units associated with the data backup area.

In a step S1110, the memory management circuit 202 records at least a portion of the write command in one of the physical erasing units associated with the command recording area.

However, the step S1108 and the step S1110 may interchange. The invention is not limited to the sequence of each of the steps in FIG. 11. Moreover, each of the steps in FIG. 11 is described in details as above and no more description is incorporated in the specification.

In summary, the embodiments of the invention provides a data management method, a memory controller, and a memory storage device, wherein a write command given by a host system is backed up in a rewriteable non-volatile memory, thereby re-building missing data according to the write commands.

The previously described exemplary embodiments of the present invention have the advantages aforementioned, wherein the advantages aforementioned not required in all versions of the invention.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A data management method for a rewritable non-volatile memory module, wherein the rewritable non-volatile memory comprises a first memory unit and a second memory unit, the first memory unit comprises a plurality of first physical erasing units, and the second memory unit comprises a plurality of second physical erasing units, the data management method comprising:

grouping the plurality of the first physical erasing units into at least a data area and a spare area, and grouping the plurality of the second physical erasing units into at least a data backup area and a command recording area;

configuring a plurality of logical addresses to map to the plurality of the first physical erasing units associated with the data area;

receiving a write command, wherein the write command instructs to write a first data to at least one first logical address of the plurality of the logical addresses;

writing the first data to one of the plurality of the first physical erasing units associated with the spare area of the first memory unit and writing the first data to one of the plurality of the second physical erasing units associated with the data backup area of the second memory unit in response to the write command;

recording at least a portion of the write command in one of the plurality of the second physical erasing units associated with the command recording area; and executing a data merging procedure on a valid data in the plurality of the first physical erasing units related to the first data and the first data, wherein a valid data in the plurality of the second physical erasing units related to the first data does not carry out the data merging procedure with the first data.

2. The data management method according to claim 1, wherein the first data includes a first portion and a second portion, wherein writing the first data to one of the plurality of the first physical erasing units associated with the spare area and writing the first data to one of the plurality of the second physical erasing units associated with the data backup area comprises steps of:
enabling the first memory unit, and transmitting a first command to the first memory unit, wherein the first command instructs that the first portion is to be written;
enabling the second memory unit, and transmitting the first command to the second memory unit;
transmitting the first portion to the first memory unit and the second memory unit;
enabling the first memory unit and the second memory unit, and transmitting a second command to the first memory unit and the second memory unit, wherein the second command represents that a transmission of the first portion is complete;
enabling the first memory unit, transmitting a third command to the first memory unit, wherein the third command instructs that the second portion is to be written;
enabling the second memory unit, transmitting the third command to the second memory unit;
transmitting the second portion to the first memory unit and the second memory unit; and
enabling the first memory unit and the second memory unit, transmitting a fourth command to the first memory unit and the second memory unit, wherein the fourth command instructs to write the first portion and the second portion.

3. The data management method according to claim 1, wherein the first data is written to a third physical erasing unit in the plurality of the second physical erasing units associated with the data backup area, wherein recording at least the portion of the write command in one of the plurality of the second physical erasing units associated with the command recording area comprises steps of:
writing an initial physical address of the third physical erasing unit and a data length of the first data to one of the plurality of the second physical erasing units associated with the command recording area, wherein the first data begins to be written from the initial physical address.

4. The data management method according claim 3, wherein writing the first data to one of the plurality of the second physical erasing units associated with the data backup area further comprises steps of:
building up a front indicator, wherein the front indicator indicates a first physical programming unit in a fourth physical erasing unit in the plurality of the second physical erasing units associated with the data backup area;
building up a rear indicator, wherein the rear indicator indicates a fifth physical erasing unit in the plurality of the second physical erasing units associated with the data backup area;
writing the first data to the first physical programming unit;
determining whether a spare memory space of the plurality of the second physical erasing units associated with the data backup area is adequate for writing the first data;
if the spare memory space is inadequate for writing the first data, erasing the fifth physical erasing unit, writing the first data to the fifth physical erasing unit, moving the rear indicator to a sixth physical erasing unit, and moving the front indicator to the physical programming unit following the first data.

5. The data management method according to claim 4, wherein determining whether the spare memory space is adequate for writing the first data comprises steps of:
determining whether a sum of a physical address of the first physical programming unit and the data length is greater than a physical address of the fifth physical erasing unit;
if the sum of the physical address of the first physical programming unit and the data length is greater than the physical address of the fifth physical erasing unit, then determining that the spare memory space is inadequate for writing the first data,
wherein a programming sequence of the sixth physical erasing unit follows the fifth physical erasing unit.

6. The data management method according to claim 3, wherein each of the plurality of the second physical erasing units comprises a plurality of physical programming units, wherein recording at least a portion of the write command in one of the plurality of the second physical erasing units associated with the command recording area comprises steps of:
grouping the plurality of the second physical erasing units in the command recording area into a first command recording area and a second command recording area;
building up a first indicator and a second indicator, wherein the first indicator and the second indicator indicate one of the plurality of the second physical programming units associated with the first command recording area or indicate one of the plurality of the second physical programming units associated with the second command recording area;
recording at least the portion of the write command in the physical programming unit indicated by the second indictor, and moving the second indicator to next physical programming unit; and
if both of the first indicator and the second indicator indicate the second command recording area, erasing one of the plurality of the second physical erasing units associated with the first command recording area.

7. The data management method according to claim 6, further comprising:
further grouping the plurality of the first physical erasing units into a system area; and
writing the first indicator, the second indicator, a front indicator, and a rear indicator to one of the plurality of the first physical erasing units associated with the system area.

8. The data management method according to claim 3, further comprising:
reading the initial physical address of the third physical erasing unit and the data length of the first data in the plurality of the second physical erasing units associated with the command recording area;
reading the first data in the data backup area according to the data length of the first data and the initial physical address of the third physical erasing unit; and
writing the first data to one of the plurality of the first physical erasing units.

9. The data management method according to claim 1, wherein each of the plurality of the second physical erasing units comprises a plurality of physical programming unit sets, each of the plurality of the physical programming unit sets comprises a lower physical programming unit and an upper physical programming unit, and the writing speed of the lower physical programming unit is greater than the writing speed of the upper physical programming unit, wherein recording at least a portion of the write command in one of the plurality of the second physical erasing units associated with the command recording area comprises steps of:

only using the plurality of the lower physical programming units of the plurality of the second physical erasing units associated with the command recording area to record at least the portion of the write command.

10. The data management method according to claim 1, further comprising:

executing a first wear-leveling procedure on the plurality of the first physical erasing units; and executing a second wear-leveling procedure on the plurality of the second physical erasing units, wherein the first wear-leveling procedure is different from the second wear-leveling procedure, and an exchanging frequency between the plurality of the first physical erasing units is higher than an exchanging frequency between the plurality of the second physical erasing units.

11. A memory storage device, comprising:

a connector, coupled to a host system;

a rewritable non-volatile memory module, comprising a first memory unit and a second memory unit, the first memory unit comprising a plurality of first physical erasing units, the second memory unit comprising a plurality of second physical erasing units; and a memory controller, coupled to the connector and the rewritable non-volatile memory module, configured to group the plurality of the first physical erasing units into at least a data area and a spare area, group the plurality of the second physical erasing units into at least a data backup area and a command recording area, and configure a plurality of logical addresses to map to the plurality of the first physical erasing units associated with the data area, wherein the memory controller is configured to receive a write command, wherein the write command instructs to write a first data to at least a first logical address of the plurality of the logical addresses, wherein the memory controller is configured to write the first data to one of the first physical erasing units associated with the spare area of the first memory unit and write the first data to one of the plurality of the second physical erasing units associated with the data backup area of the second memory unit in response to the write command, and record at least a portion of the write command in one of the plurality of the second physical erasing units associated with the command recording area, wherein the memory controller is further configured to execute a data merging procedure on a valid data in the plurality of the first physical erasing units related to the first data and the first data, wherein a valid data in the plurality of the second physical erasing units related to the first data does not carry out the data merging procedure with the first data.

12. The memory storage device according to claim 11, wherein the first data comprises a first portion and a second portion, wherein the operation that the memory controller writes the first data to one of the first physical erasing units associated with the spare area and writes the first data to one of the plurality of the second physical erasing units associated with the data backup area comprises:

the memory controller is configured to enable the first memory unit, and transmit a first command to the first memory unit, wherein the first command instructs that the first portion is to be written, the memory controller is configured to enable the second memory unit, and transmit the first command to the second memory unit, and transmit the first portion to the first memory unit and the second memory unit, the memory controller is configured to enable the first memory unit and the second memory unit, and transmit a second command to the first memory unit and the second memory unit, wherein the second command represents that a transmission of the first portion is complete, the memory controller is configured to enable the first memory unit, and transmit a third command to the first memory unit, wherein the third command instructs that the second portion is to be written, the memory controller is configured to enable the second memory unit, transmit the third command to the second memory unit, and transmit the second portion to the first memory unit and the second memory unit, the memory controller is configured to enable the first memory unit and the second memory unit, and transmit a fourth command to the first memory unit and the second memory unit, wherein the fourth command instructs to write the first portion and the second portion.

13. The memory storage device according to claim 11, wherein the first data is written to a third physical erasing unit in the plurality of the second physical erasing units associated with the data backup area, wherein the operation that the memory controller records at least a portion of the write command in one of the plurality of the second physical erasing units associated with the command recording area comprises that the memory controller is configured to write an initial physical address of the third physical erasing unit and a data length of the first data to one of the plurality of the second physical erasing units associated with the command recording area, wherein the first data begins to be written from the initial physical address.

14. The memory storage device according to claim 13, wherein the memory controller is further configured to build up a front indicator, wherein the front indicator indicates a first physical programming unit in a fourth physical erasing unit in the plurality of the second physical erasing units associated with the data backup area, wherein the memory controller is further configured to build up a rear indicator, wherein the rear indicator indicates a fifth physical erasing unit in the plurality of the second physical erasing units associated with the data backup area, wherein the memory controller is further configured to write the first data to the first physical programming unit, and determines whether a spare memory space of the plurality of the second physical erasing units associated with the data backup area is adequate for writing the first data, if the spare memory space is inadequate for writing the first data, the memory controller is further configured to erase the fifth physical erasing unit, write the first data to the fifth physical erasing unit, move the rear indicator to a sixth physical erasing unit, and move the front indicator to the physical programming unit following the first data.

15. The memory storage device according to claim 14, wherein the operation that the memory controller determines whether a spare memory space of the plurality of the second physical erasing units associated with the data backup area is adequate for writing the first data comprises that the memory controller is configured to determine whether a sum of a physical address of the first physical programming unit and the data length is greater than a physical address of the fifth physical erasing unit, if the sum of the physical address of the first physical programming unit and the data length is greater than the physical address of the fifth physical erasing unit, the memory controller determines that the spare memory space is inadequate for writing the first data, wherein a programming sequence of the sixth physical erasing unit follows the fifth physical erasing unit.

16. The memory storage device according to claim 13, wherein each of the plurality of the second physical erasing units comprises a plurality of physical programming units, wherein the operation that the memory controller records at least a portion of the write command in one of the plurality of the second physical erasing units associated with the command recording area comprises:

the memory controller is configured to group the plurality of the second physical erasing units in the command recording area into a first command recording area and a second command recording area, and build up a first indicator and a second indicator, wherein the first indicator and the second indicator indicate one of the plurality of the second physical erasing units associated with the first command recording area or indicate one of the plurality of the physical programming unites associated with the second command recording area, the memory controller is configured to record the at least the portion of the write command in the physical programming unit indicated by the second indicator, and move the second indicator to next physical programming unit, if both of the first indicator and the second indicator indicate the second command recording area, the memory controller is configured to erase one of the plurality of the second physical erasing units associated with the first command recording area.

17. The memory storage device according to claim 16, wherein the memory controller is further configured to group the plurality of the first physical erasing units into a system area, and write the first indicator, the second indicator, a front indicator, and a rear indicator to one of the plurality of the first physical erasing units associated with the system area.

18. The memory storage device according to claim 13, wherein the memory controller is further configured to read the initial physical address of the third physical erasing unit and the data length of the first data in the plurality of the second physical erasing units associated with the command recording area, the memory controller is further configured to read the first data in the data backup area according to the data length of the first data and the initial physical address of the third physical erasing unit, the memory controller is further configured to write the first data to one of the plurality of the first physical erasing units.

19. The memory storage device according to claim 11, wherein each of the plurality of the second physical erasing units comprises a plurality of physical programming unit sets, each of the plurality of programming unit sets comprises a lower physical programming unit and an upper physical programming unit, and the writing speed of the lower physical programming unit is greater than the writing speed of the upper physical programming unit, wherein the operation that the memory controller records at least a portion of the write command in one of the plurality of the second physical erasing units associated with the command recording area comprises:

the memory controller is configured to use only the plurality of the lower physical programming units of the plurality of the second physical erasing units associated with the command recording area to record at least the portion of the write command.

20. The memory storage device according to claim 11, wherein the memory controller is further configured to execute a first wear-leveling procedure on the plurality of the first physical erasing units, and execute a second wear-leveling procedure on the plurality of the second physical erasing units, wherein the first wear-leveling procedure is different from the second wear-leveling procedure, and an exchanging frequency between the plurality of the first physical erasing units is higher than an exchanging frequency between the plurality of the second physical erasing units.

21. A memory controller, comprising:

a host interface, coupled to a host system;

a memory interface, coupled to a rewritable non-volatile memory module, wherein the rewritable non-volatile memory module comprises a first memory unit and a second memory unit, the first memory unit comprises a plurality of first physical erasing units, and the second memory unit comprises a plurality of second physical erasing units; and a memory management circuit, coupled to the host interface and the memory interface, is configured to group the plurality of the first physical erasing units into at least a data area and a spare area, group the plurality of the second physical erasing units into at least a data backup area and a command recording area, and configure a plurality of logical addresses to map to the plurality of the first physical erasing units associated with the data area, wherein the memory management circuit is configured to receive a write command, wherein the write command instructs to write a first data to at least a first logical address of the plurality of the logical addresses, wherein the memory management circuit is configured to write the first data to one of the plurality of the first physical erasing units associated with the spare area of the first memory unit and write the first data to one of the plurality of the second physical erasing units associated with the data backup area of the second memory unit in response to the write command, and record at least a portion of the write command in one of the plurality of the second physical erasing units associated with the command recording area, wherein the memory management circuit is further configured to execute a data merging procedure on a valid data in the plurality of the first physical erasing unit related to the first data and the first data, wherein a valid data in the plurality of the second physical erasing units related to the first data does not carry out the data merging procedure with the first data.

22. The memory controller according to claim 21, wherein the first data comprises a first portion and a second portion, wherein the operation that the memory management circuit writes the first data to one of the first physical erasing units associated with the spare area and writes the first data to one of the plurality of the second physical erasing units associated with the data backup area comprises:
the memory management circuit is configured to enable the first memory unit, and transmit a first command to the first memory unit, wherein the first command instructs that the first portion is to be written,
the memory management circuit is configured to enable the second memory unit, transmit the first command to the second memory unit, and transmit the first portion to the first memory unit and the second memory unit,
the memory management circuit is configured to enable the first memory unit and the second memory unit, and transmit a second command to the first memory unit and the second memory unit, wherein the second command represents that the transmission of the first portion is complete,
the memory management circuit is configured to enable the first memory unit, and transmit a third command to the first memory unit, wherein the third command instructs that the second portion is to be written,
the memory management circuit is configured to enable the second memory unit, transmit the third command to the second memory unit, and transmit the second portion to the first memory unit and the second memory unit,
the memory management circuit is configured to enable the first memory unit and the second memory unit, and transmit a fourth command to the first memory unit and the second memory unit, wherein the fourth command instructs to write the first portion and the second portion.

23. The memory controller according to claim 21, wherein the first data is written to a third physical erasing unit in the plurality of the second physical erasing units associated with the data backup area,
wherein the operation that the memory management circuit records at least a portion of the write command in one of the plurality of the second physical erasing units associated with the command recording area comprises that the memory management circuit is configured to write an initial physical address of the third physical erasing unit and a data length of the first data to one of the plurality of the second physical erasing units associated with the command recording area, wherein the first data begins to be written from the initial physical address.

24. The memory controller according to claim 23, wherein the memory management circuit is further configured to build up a front indicator, wherein the front indicator indicates a first physical programming unit in a fourth physical erasing unit in the plurality of the second physical erasing units associated with the data backup area,
wherein the memory management circuit further builds up a rear indicator, wherein the rear indicator indicates a fifth physical erasing unit in the plurality of the second physical erasing units associated with the data backup area,
wherein the memory management circuit is further configured to write the first data to the first physical programming unit, and determine whether a spare memory space of the plurality of the second physical erasing units associated with the data backup area is adequate for writing the first data,
if the spare memory space is inadequate for writing the first data, the memory management circuit is further configured to erase the fifth physical erasing unit, write the first data to the fifth physical erasing unit, move the rear indicator to a sixth physical erasing unit, and move the front indicator to the physical programming unit following the first data.

25. The memory controller according to claim 24, wherein the operation that the memory management circuit determines whether a spare memory space of the plurality of the second physical erasing units associated with the data backup area is adequate for writing the first data comprises that the memory management circuit is configured to determine whether a sum of a physical address of the first physical programming unit and the data length is greater than a physical address of the fifth physical erasing unit,
if the sum of the physical address of the first physical programming unit and the data length is greater than the physical address of the fifth physical erasing unit, the memory management circuit is configured to determine that the spare memory space is inadequate for writing the first data,
wherein a programming sequence of the six physical erasing unit follows the fifth physical erasing unit.

26. The memory controller according to claim 23, wherein each of the plurality of the second physical erasing units comprises a plurality of physical programming unit, wherein the operation that the memory management circuit records at least a portion of the write command in one of the plurality of the second physical erasing units associated with the command recording area comprises:
the memory management circuit is configured to group the plurality of the second physical erasing units in the command recording area into a first command recording area and a second command recording area, and build up a first indicator and a second indicator, wherein the first indicator and the second indicator indicate one of the plurality of the second physical erasing units associated with the first command recording area or indicate one of the plurality of the physical programming units associated with the second command recording area,
the memory management circuit is configured to record at least the portion of the write command in the physical programming unit indicated by the second indicator, and moves the second indicator to next physical programming unit,
if both of the first indicator and the second indicator indicate the second command recording area, the memory management circuit is configured to erase one of the plurality of the second physical erasing units associated with the first command recording area.

27. The memory controller according to claim 26, wherein the memory management circuit is further configured to group the plurality of the first physical erasing units into a system area, and write the first indicator, the second indicator, a front indicator, and a rear indicator to one of the plurality of the first physical erasing units associated with the system area.

28. The memory controller according to claim 23, wherein the memory management circuit is further configured to read the initial physical address of the third physical erasing unit and the data length of the first data in the plurality of the second physical erasing units associated with the command recording area, the memory management circuit is further configured to read the first data in the data backup area according to the data length of the first data and the initial physical address of the third physical erasing unit, the memory management circuit is further configured to write the first data to one of the plurality the first physical erasing units.

29. The memory controller according to claim 21, wherein each of the plurality of the second physical erasing units comprises a plurality of physical programming unit sets, each of the plurality of the physical programming unit sets comprises a lower physical programming unit and an upper physical programming unit, and the writing speed of the lower physical programming unit is greater than the writing speed of the upper physical programming unit, wherein the operation that the memory management circuit records at least a portion of the write command in one of the plurality of the second physical erasing units associated with the command recording area comprises:

the memory management circuit is configured to use only the plurality of the lower physical programming units of the plurality of the second physical erasing units associated with the command recording area to record at least the portion of the write command.

30. The memory controller according to claim 21, wherein the memory management circuit is further configured to execute a first wear-leveling procedure on the plurality of the first physical erasing units, and execute a second wear-leveling procedure on the plurality of the second physical erasing units, wherein the first wear-leveling procedure is different from the second wear-leveling procedure, and an exchanging frequency between the plurality of the first physical erasing units is higher than an exchanging frequency between the plurality of the second erasing units.

\* \* \* \* \*